(12) United States Patent
Cunnigan et al.

(10) Patent No.: US 7,426,064 B2
(45) Date of Patent: Sep. 16, 2008

(54) SCAN BAR AND METHOD FOR SCANNING AN IMAGE

(75) Inventors: Stephen K. Cunnigan, Fayette, KY (US); David K. Murray, Fayette, KY (US)

(73) Assignee: Lexmark International, Inc, Lexington, KY (US)

(*) Notice: Subject to any disclaimer, the term of this patent is extended or adjusted under 35 U.S.C. 154(b) by 994 days.

(21) Appl. No.: 10/730,504

(22) Filed: Dec. 8, 2003

(65) Prior Publication Data

US 2005/0122548 A1 Jun. 9, 2005

(51) Int. Cl.
*H04N 1/04* (2006.01)

(52) U.S. Cl. ............... 358/497; 358/474; 358/482; 358/483

(58) Field of Classification Search ........... 358/497, 358/494, 474, 483, 482, 486, 505, 512–514; 250/208.1, 216, 239; 399/211; 382/312, 382/318, 319
See application file for complete search history.

(56) References Cited

U.S. PATENT DOCUMENTS

| | | | |
|---|---|---|---|
| 4,866,512 A | 9/1989 | Hirosawa et al. | |
| 4,870,505 A | 9/1989 | Mitsuki | |
| 5,025,313 A | 6/1991 | Parulski et al. | |
| 5,085,306 A | 2/1992 | Beigang | |
| 5,373,371 A | 12/1994 | Masui | |
| 5,668,588 A | 9/1997 | Morizumi et al. | |
| 5,875,042 A | 2/1999 | Kashitani et al. | |
| 5,920,063 A | 7/1999 | Kawamoto et al. | |
| 6,243,173 B1 | 6/2001 | Lee et al. | |
| 6,263,117 B1 | 7/2001 | Lee | |
| 6,310,691 B2 | 10/2001 | Cariffe | |
| 6,348,981 B1 | 2/2002 | Walsh | |
| 6,381,377 B1 | 4/2002 | Wang | |
| 6,512,605 B1 | 1/2003 | Watanabe et al. | |
| 2003/0202219 A1* | 10/2003 | Lien et al. ............ | 358/474 |

\* cited by examiner

*Primary Examiner*—Cheukfan Lee

(57) ABSTRACT

A scanner is obtained having a subscan axis and having a scan bar including sensor elements positioned in at least one substantially linear array. Each array lies substantially in a plane defined by the subscan and scan-bar longitudinal axes. Each array is tilted with respect to a reference axis at a substantially nonzero angle which is fixed during any image scanning of the image used to create the final scanned image. The reference axis lies in the plane and is substantially perpendicular to the subscan axis. Image scanning the image is performed by relatively moving the scan bar over the image along the subscan axis. One embodiment of the scan bar includes a scan bar body and includes sensor elements supported by the scan bar body and positioned substantially in a common plane in multiple substantially linear arrays, wherein each array is tilted with respect to the scan-bar longitudinal axis.

16 Claims, 1 Drawing Sheet

SCAN BAR AND METHOD FOR SCANNING AN IMAGE

TECHNICAL FIELD

The present invention relates generally to scanners, and more particularly to a scan bar and a method for scanning an image.

BACKGROUND OF THE INVENTION

Scanners are used to scan an image to create a scanned image which can be displayed on a computer monitor, which can be used by a computer program, which can be printed, which can be faxed, etc. One conventional method for scanning an image uses a scanner having a scan bar, wherein the scan bar includes a linear array of sensor elements aligned with the longitudinal axis of the scan bar. In one variation, an image on a rectangular sheet of paper is imaged scanned by aligning the width axis of the paper with (or making it parallel to) the longitudinal axis of the scan bar and then moving the scan bar over the image along a subscan axis of the scanner wherein the subscan axis is perpendicular to the longitudinal axis of the scan bar. In another variation, the scan bar is stationary, and the width axis of the paper is aligned with (or made parallel to) the subscan axis of the scanner after which the paper is moved over the scan bar along the lengthwise axis of the paper. The resolution of the scanned image is limited by the size of the sensor elements for an example of a scan bar having no separation distance between adjacent sensor elements. To increase resolution of the scanned image in this example, smaller and more expensive sensor elements must be used. It is known to slant/angle printhead nozzles spaced at a current limited distance to achieve a higher dpi (dots-per-inch) than the actual nozzle spacing.

What is needed is an improved scan bar and/or an improved method for scanning an image.

SUMMARY OF THE INVENTION

A broad method of the invention is for scanning an image. One step of the broad method includes obtaining a scanner having a subscan axis and having a scan bar, wherein the scan bar includes a longitudinal axis and includes a plurality of sensor elements disposed in at least one substantially linear array, wherein each array lies substantially in a plane defined by the subscan axis and the longitudinal axis, wherein each array is tilted with respect to a reference axis at a substantially nonzero angle which is fixed during any image scanning of the image used to create the final scanned image, and wherein the reference axis lies in the plane and is substantially perpendicular to the subscan axis. Another step of the broad method includes image scanning the image by relatively moving the scan bar over the image along the subscan axis.

An embodiment of the invention is a scan bar of a scanner. The scan bar includes a scan bar body having a longitudinal axis. The scan bar also includes a plurality of sensor elements which are supported by the scan bar body and which are positioned substantially in a common plane in multiple substantially linear arrays. Each array is tilted with respect to the longitudinal axis at a substantially nonzero angle.

Several benefits and advantages are derived from the broad method and/or the embodiment of the invention. By performing any image scanning used to create the final scanned image by using at least one linear sensor array which is not perpendicular to the subscan axis, a greater number of sensor elements will scan the image thereby increasing scanning resolution. A tilt angle of thirty degrees improves scanner resolution by approximately fifteen percent, and a tilt angle of forty-five degrees improves scanner resolution by approximately thirty percent.

DETAILED DESCRIPTION

Figure 1:
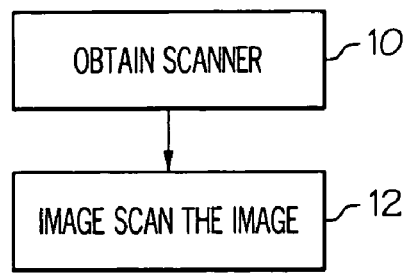
FIG. 1 is a block diagram of a first method of the invention for scanning an image.
Figure 2:
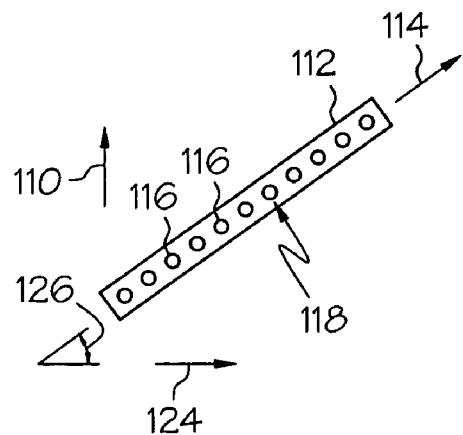
FIG. 2 is a schematic planar view of a first embodiment of a scan bar of a scanner used in an illustration of the first method of FIG. 1.

FIGS. 1-2 illustrate a first method of the invention which is for scanning an image and includes steps a) and b). Step a) is labeled as "Obtain Scanner" in block 10 of FIG. 1. Step a) includes obtaining a scanner having a subscan axis 110 and having a scan bar 112. The scan bar 112 includes a longitudinal axis 114 and includes a plurality of sensor elements 116 disposed in a substantially linear array 118 substantially along the longitudinal axis 114. The scan bar 112 is tilted with respect to a reference axis 124 at a substantially nonzero angle 126 which is fixed during any image scanning of the image used to create the final scanned image. The reference axis 124 lies substantially in a plane defined by the subscan axis 110 and the longitudinal axis 114, and the reference axis 124 is substantially perpendicular to the subscan axis 110. Step b) is labeled as "Image Scan The Image" in block 12 of FIG. 1. Step b) includes image scanning the image by relatively moving the scan bar 112 over the image along the subscan axis 110.

The expression "relatively moving the scan bar over the image" includes moving the scan bar 112 over a stationary image, moving the image over a stationary scan bar 112, and moving both the scan bar 112 and the image. In one example of the scan bar 112, the sensor elements 116 are contact imaging sensor elements. Other examples are left to those skilled in the art.

It is noted that modifications to standard techniques for generating a final scanned image using a non-tilted scan bar to accommodate using a tilted scan bar 112 are within the level of skill of the artisan and optionally includes, but are not limited to, omitting unnecessary pixel sampling at the beginning and end of an image scan. It is also noted that some scanners perform a prescan and then perform an image scan, wherein the prescan gathers information useful for the scanner in creating the final scanned image from the image scan.

In one implementation of the first method, the image is disposed on a substantially rectangular sheet of paper, wherein the subscan axis 110 is substantially parallel to or substantially aligned with the length axis of the paper, and wherein the reference axis 124 is substantially parallel to or substantially aligned with the width axis of the paper. This can be visualized in FIG. 2 by imagining the sheet of paper to be under the scan bar 112 with the left edge of the sheet aligned with the subscan axis 110 and with the bottom edge of the sheet aligned with the reference axis 124. In one construction the tilted scan bar 112 is lengthened, as necessary, to span the complete width of the paper. It is noted that two parallel lines never meet and that two aligned lines coincide. It is also noted that the sheet and the image on the sheet have been omitted from FIG. 2 for clarity.

In one extension of the first method, there is also included the step of having the user select a particular value for the angle 126 for the image scanning of the image. The higher the resolution desired, the greater must be the particular value selected for the angle 126. In one variation, the user adjusts the angle 126. In one construction, the scan bar 112 is pivotable about a fixed location and rotated by a ratcheted toggle. In another variation, the scanner automatically adjusts the angle 126 in response to the value for the angle 126 selected by the user. In one construction, the scan bar 112 is pivotal about a fixed location and rotated by an external motor. In another option, the angle 126 has a particular value which has been fixed during manufacture of the scanner. Other constructions are left to the artisan.

In one enablement of the first method, the angle 126 has a value between and including fifteen degrees and seventy-five degrees. In one modification, the angle 126 has a value between and including thirty degrees and forty-five degrees. It is noted that an angle having a value between and including x degrees and y degrees includes an angle having a value between and including plus x degrees and plus y degrees and includes an angel having a value between and including minus x degrees and minus y degrees.

Figure 3:
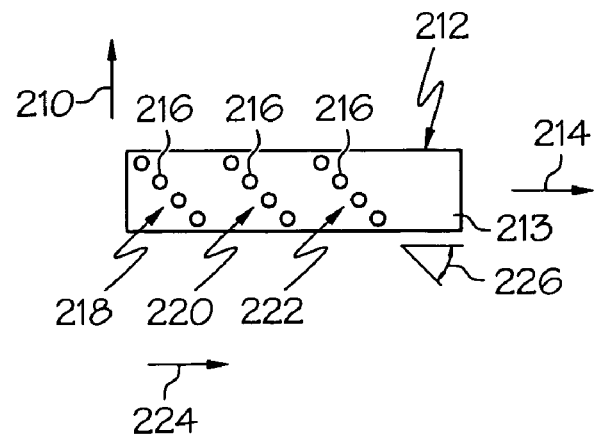
FIG. 3 is a schematic view planar view of an embodiment of the invention which is a second embodiment of a scan bar of a scanner which is used in an illustration of a second method of the invention for scanning an image.

FIG. 3 illustrates an embodiment of the invention which is a scan bar 212 of a scanner. The scan bar 212 includes a scan bar body 213 having a longitudinal axis 214 and includes a plurality of sensor elements 216. The sensor elements 216 are supported by the scan bar body 213 and are disposed substantially in a common plane in multiple substantially linear arrays 218, 220 and 222. Each array 218, 220 and 222 is tilted with respect to the longitudinal axis 214 at a substantially nonzero angle 226. It is seen from FIG. 3 that the arrays 218, 220 and 222 are nonaligned arrays.

It is noted that in one example, an insubstantially nonzero angle is a nonzero angle resulting from manufacturing tolerances for an intended zero angle. In a first construction of the embodiment of FIG. 3, each array 218, 220 and 222 is tilted with respect to the longitudinal axis 214 at a substantially identical angle. The expression "substantially identical angle" means an angle identical in sign and substantially identical in magnitude. In the first construction, the arrays 212, 220 and 222 are substantially parallel arrays as seen in FIG. 3. In one variation, the identical angle has a value between and including fifteen degrees and seventy-five degrees. In one modification, the identical angle has a value between and including thirty degrees and forty-five degrees.

A second method of the invention is for scanning an image and includes steps a) and b). Step a) includes obtaining a scanner having a subscan axis 210 and having a scan bar 212. The scan bar 212 includes a longitudinal axis 214 and includes a plurality of sensor elements 216 disposed in multiple substantially linear arrays 218, 220 and 222. The longitudinal axis 214 is substantially perpendicular to the subscan axis 210. Each array 218, 220 and 222 lies substantially in a plane defined by the subscan axis 210 and the longitudinal axis 214. Each array 218, 220 and 222 is tilted with respect to the longitudinal axis 214 at a substantially identical and substantially nonzero angle 226 which is fixed during any image scanning of the image used to create the final scanned image. Step b) includes image scanning the image by relatively moving the scan bar 212 over the image along the subscan axis 210.

In one implementation of the second method, the image is disposed on a substantially rectangular sheet of paper, wherein the subscan axis 210 is substantially parallel to or substantially aligned with the length axis of the paper, and wherein the longitudinal axis 214 is substantially parallel to or substantially aligned with the width axis of the paper. In one enablement of the second method, the angle 226 has a value between and including fifteen degrees and seventy-five degrees. In one modification, the angle 226 has a value between and including thirty degrees and forty-five degrees.

A broad method of the invention includes, but is broader than, each of the previously described first and second methods of the invention. The broad method is a method for scanning an image and includes steps a) and b). Step a) includes obtaining a scanner having a subscan axis 110 or 210 and having a scan bar 112 or 212. The scan bar 112 or 212 includes a longitudinal axis 114 or 214 and includes a plurality of sensor elements 116 or 216 disposed in at least one substantially linear array 118 or 218, 220 and 222. Each array 118 or 218, 220 and 222 lies substantially in a plane defined by the subscan axis 110 or 210 and the longitudinal axis 114 or 214. Each array 118 or 218, 220 and 222 is tilted with respect to a reference axis 124 or 224 at a substantially nonzero angle 126 or 226 which is fixed during any image scanning of the image used to create the final scanned image. The reference axis 124 or 224 lies in the plane and is substantially perpendicular to the subscan axis 110 or 210. Step b) includes image scanning the image by relatively moving the scan bar 112 or 212 over the image along the subscan axis 110 or 210.

It is noted that in the broad method, when there is more than one array 218, 220 and 222, the angle 226 for each array need not be an identical angle, and the scan bar 212 need not be substantially parallel to or substantially aligned with the reference axis 224.

In one implementation of the broad method, the image is disposed on a substantially rectangular sheet of image media, wherein the subscan axis 110 or 210 is substantially parallel to or substantially aligned with the length axis of the image media, and wherein the reference axis 124 or 224 is substantially parallel to or substantially aligned with the width axis of the image media. It is noted that in this implementation, the image media is not limited to paper, wherein other types of image media are left to the artisan.

In one extension of the broad method, there is also included the step of having the user select a particular value for the angle 126 or 226 for the image scanning of the image. In another option, the angle 126 or 226 has a particular value which has been fixed during manufacture of the scanner.

In one enablement of the broad method, the angle 126 or 226 has a value between and including fifteen degrees and seventy-five degrees. In one modification, the angle 126 or 226 has a value between and including thirty degrees and forty-five degrees.

In one application of the broad method, the at-least-one substantially linear array consists of a single array 118. In one variation, the single array 118 is aligned substantially along the longitudinal axis 114 and the longitudinal axis 114 is tilted at the angle 126 with respect to the reference axis 124.

In another application of the broad method, the at-least-one substantially linear array consists of multiple, substantially parallel arrays 218, 220 and 222. In one construction, the angle 226 of each array 218, 220 and 222 is equal in magnitude and sign. In another construction, the angle 226 of at least two of the arrays 218, 220 and 222 is not equal in magnitude and/or sign. In one variation, the longitudinal axis 214 is substantially parallel to or substantially aligned with the reference axis 224. In another variation, the longitudinal axis 214 is neither substantially parallel to nor substantially aligned with the reference axis 224.

Several benefits and advantages are derived from the broad method and/or the embodiment of the invention. By performing any image scanning used to create the final scanned image by using at least one linear sensor array which is not perpendicular to the subscan axis, a greater number of sensor elements will scan the image thereby increasing scanning resolution. A tilt angle of thirty degrees improves scanner resolution by approximately fifteen percent, and a tilt angle of forty-five degrees improves scanner resolution by approximately thirty percent.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A method for scanning an image comprising the steps of:
   a) obtaining a scanner having a subscan axis and having a scan bar, wherein the scan bar includes a longitudinal axis and includes a plurality of sensor elements disposed in a substantially linear array substantially along the longitudinal axis, wherein the scan bar is tilted with respect to a reference axis at a substantially nonzero angle which is fixed during any image scanning of the image used to create the final scanned image, wherein the reference axis lies substantially in a plane defined by the subscan axis and the longitudinal axis, and wherein the reference axis is substantially perpendicular to the subscan axis; and
   b) image scanning the image by relatively moving the scan bar over the image along the subscan axis, and also including the step of receiving from a user a particular value for the angle for the image scanning of the image.

2. The method of claim 1, wherein the image is disposed on a substantially rectangular sheet of paper, wherein the subscan axis is substantially parallel to or substantially aligned with the length axis of the paper, and wherein the reference axis is substantially parallel to or substantially aligned with the width axis of the paper.

3. The method of claim 1, wherein the angle has a value between and including thirty degrees and forty-five degrees.

4. A method for scanning an image comprising the steps of:
   a) obtaining a scanner having a subscan axis and having a scan bar, wherein the scan bar includes a longitudinal axis and includes a plurality of sensor elements disposed in multiple substantially linear arrays, wherein the longitudinal axis is substantially perpendicular to the subscan axis, wherein each array lies substantially in a plane defined by the subscan axis and the longitudinal axis, wherein each array is tilted with respect to the longitudinal axis at a substantially identical and substantially nonzero angle which is fixed during any image scanning of the image used to create the final scanned image; and
   b) image scanning the image by relatively moving the scan bar over the image along the subscan axis.

5. The method of claim 4, wherein the image is disposed on a substantially rectangular sheet of paper, wherein the subscan axis is substantially parallel to or substantially aligned with the length axis of the paper, and wherein the longitudinal axis is substantially parallel to or substantially aligned with the width axis of the paper.

6. The method of claim 4, wherein the angle has a value between and including thirty degrees and forty-five degrees.

7. A method for scanning an image comprising the steps of:
   a) obtaining a scanner having a subscan axis and having a scan bar, wherein the scan bar includes a longitudinal axis and includes a plurality of sensor elements disposed in at least one substantially linear array, wherein each array lies substantially in a plane defined by the subscan axis and the longitudinal axis, wherein each array is tilted with respect to a reference axis at a substantially nonzero angle which is fixed during any image scanning of the image used to create the final scanned image, and wherein the reference axis lies in the plane and is substantially perpendicular to the subscan axis; and
   b) image scanning the image by relatively moving the scan bar over the image along the subscan axis, and also including the step of receiving from a user a particular value for the angle for the image scanning of the image.

8. The method of claim 7, wherein the image is disposed on a substantially rectangular sheet of image media, wherein the subscan axis is substantially parallel to or substantially aligned with the length axis of the image media, and wherein the reference axis is substantially parallel to or substantially aligned with the width axis of the image media.

9. The method of claim 7, wherein the angle has a value between and including thirty degrees and forty-five degrees.

10. The method of claim 7, wherein the at-least-one substantially linear array consists of a single array.

11. The method of claim 10, wherein the single array is aligned substantially along the longitudinal axis and wherein the longitudinal axis is tilted at the angle with respect to the reference axis.

12. The method of claim 7, wherein the at-least-one substantially linear array consists of multiple, substantially parallel arrays.

13. The method of claim 12, wherein the longitudinal axis is substantially parallel to or substantially aligned with the reference axis.

14. A scan bar of a scanner comprising:
   a) a scan bar body having a longitudinal axis; and
   b) a plurality of sensor elements supported by the scan bar body, disposed substantially in a common plane in multiple substantially linear arrays, wherein each array is tilted with respect to the longitudinal axis at a substantially nonzero angle.

15. The scan bar of claim 14, wherein each array is tilted with respect to the longitudinal axis at a substantially identical angle.

16. The scan bar of claim 15, wherein the identical angle has a value between and including thirty degrees and forty-five degrees.

* * * * *